Aug. 26, 1969

J. H. MYER 3,463,594

LASER TOOL APPARATUS

Filed Nov. 1, 1965

INVENTOR.
JON H. MYER
BY J. K. Haskell

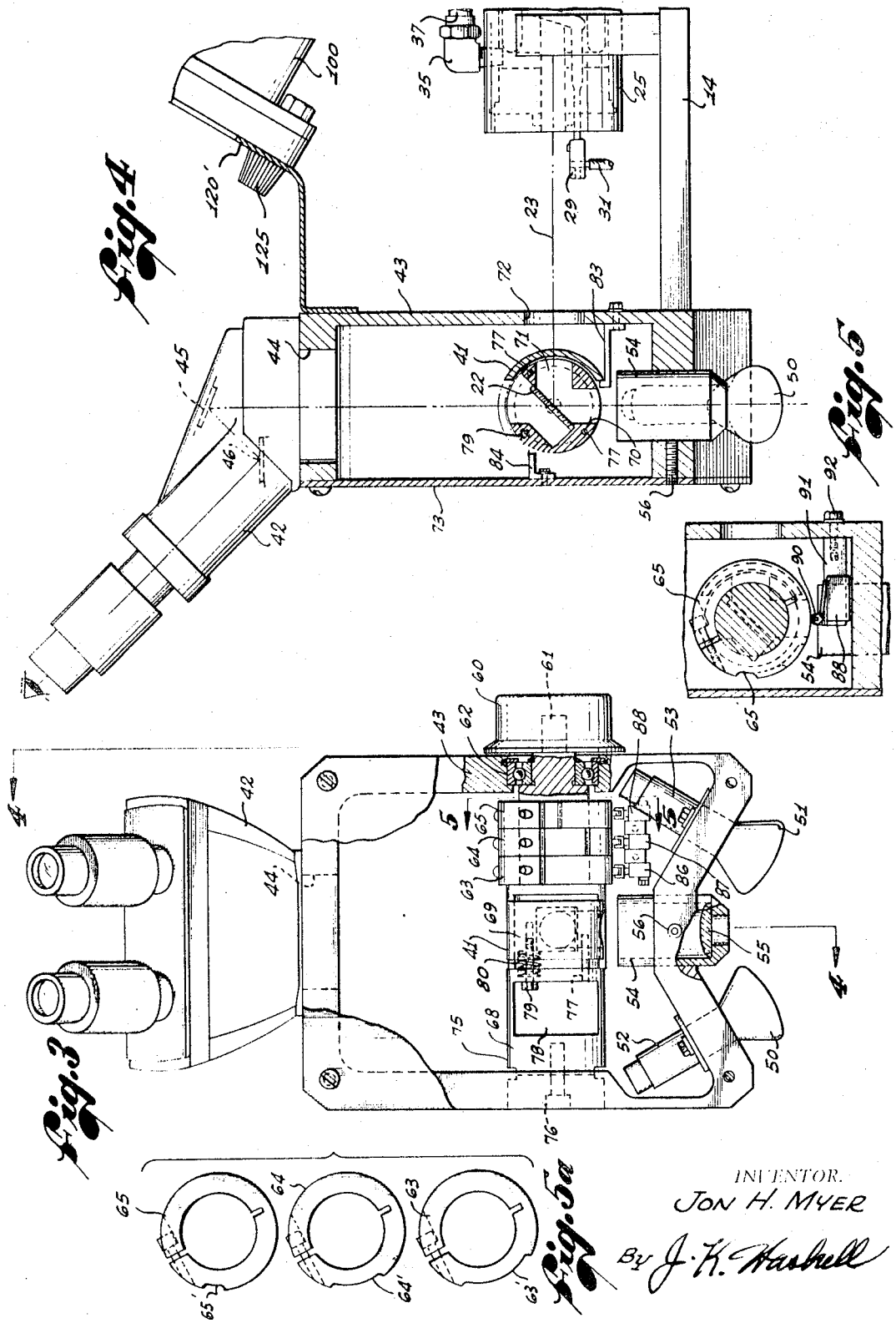

INVENTOR.
JON H. MYER
BY J. K. Haskell

United States Patent Office 3,463,594
Patented Aug. 26, 1969

3,463,594
LASER TOOL APPARATUS
Jon H. Myer, Newport Beach, Calif., assignor to Hughes Aircraft Company, Culver City, Calif., a corporation of Delaware
Filed Nov. 1, 1965, Ser. No. 505,898
Int. Cl. G01b *11/26*
U.S. Cl. 356—172                                    10 Claims

ABSTRACT OF THE DISCLOSURE

This is a laser tool apparatus which comprises a movable shield and a plurality of cams and electric switches coupled to the shield and arranged to be operated in sequence as the shield is moved to specific predetermined locations relative to the laser beam and the operator's line of sight. To operate the device, the shield is rotated to a first position in the path of the laser beam to thereby shield the operator from dangerous light energy while allowing him to align the device. Thereafter, the operator must rotate the shield into a second position, blocking the operator's line of sight and shielding him from the laser beam before the laser energy can be activated.

---

Major problems are presented in transforming laser beam devices from laboratory curiosities into practical industrial tools. Of primary importance are the ever-present danger that the laser beam can blind one who is to use such a tool, and the danger of electric shock from the extremely high and dangerous voltages required to operate a laser.

It is an object of my invention to provide a unique laser tool for industrial purposes.

It is another object of my invention to provide a laser tool in which beam operation is prevented during positioning of a work piece to be subjected to the beam.

A further object of my invention is to provide laser apparatus which can be used without danger to the operator from either the beam or high voltages required for laser operation.

A still further object of my invention is to provide laser apparatus adapted for single-shot or repetitive beam operation.

It is also an object of my invention to provide a laser tool which is inherently reliable and safe.

The above and other objects and advantages of my invention will become apparent from the following description taken in conjunction with the accompanying drawings, in which:

FIGURE 3 is an end elevation view of the microscope attachment, partially broken away to show the eye shield and switch control cam operated by the external control knob;

FIGURE 4 is a side elevation view of the microscope attachment, partially broken away to show the shutter and beam splitter in section;

FIGURE 5 is a perspective view of the switch operating cams;

FIGURE 5a is a combination exploded and end elevation view of the cams;

Figure 7:
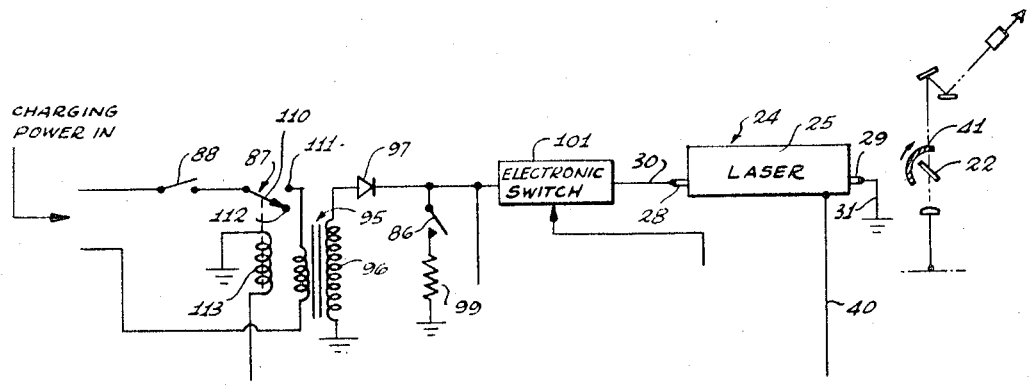
FIGURE 7 is a schematic diagram of the portion of the circuit of FIGURE 6 wherein the shorting switch for the capacitor bank is opened upon initiating movement of the external control knob to move the shield toward the laser firing position.
Figure 8:
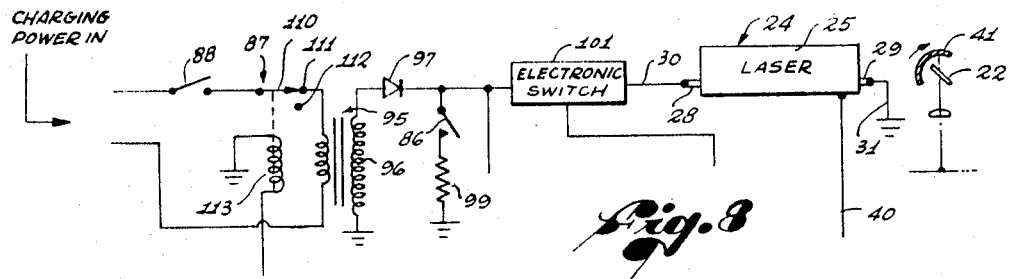
FIGURE 8 is a schematic diagram similar to FIGURE 7, showing the resettable switch of the charging circuit closed during continued movement of the shield toward the laser firing position.
Figure 9:
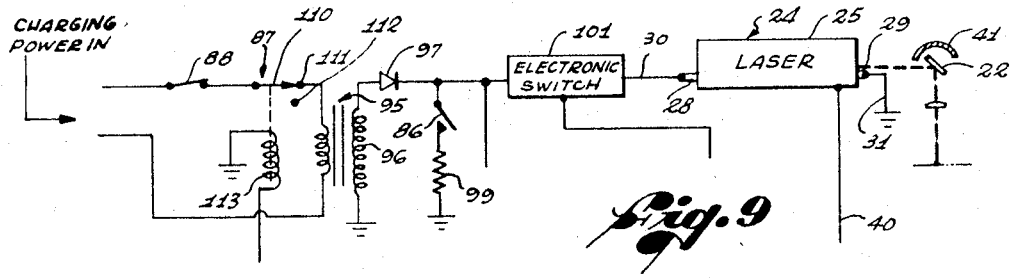
Figure 10:
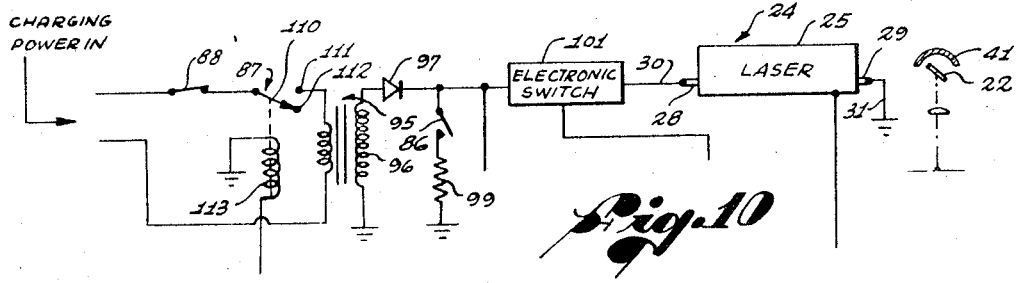

FIGURE 9 is a schematic diagram of the portion of the circuit illustrated in FIGURES 7 and 8, showing the second switch of the charging circuit closed when the shield is in the laser firing position, and indicating the firing operation of the laser; and FIGURE 10 is a schematic diagram of the portion of the circuit shown in FIGURES 7–9, showing the resettable switch in a charging circuit moved to the open position through the action of its relay immediately after the laser is triggered.

Figure 1:
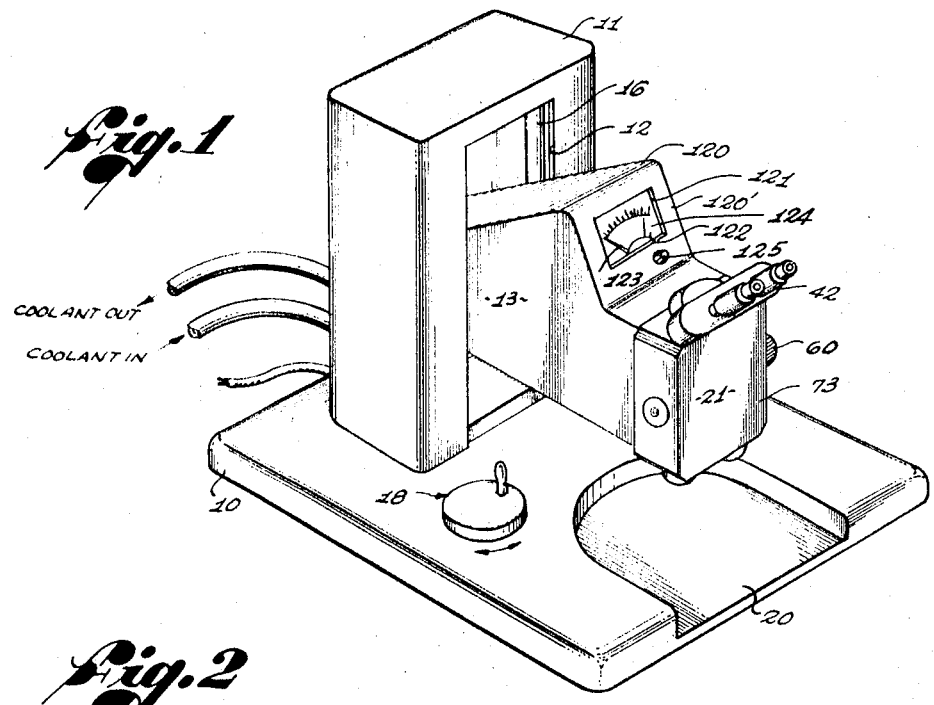
FIGURE 1 is a perspective view of a laser tool showing a microscope attachment for focusing purposes, a laser housing to be raised and lowered in conjunction with focusing, a volt meter in the charging circuit for the laser light source, and an external control knob for operating a light shield and switches to effect single-shot laser operation.
Figure 2:
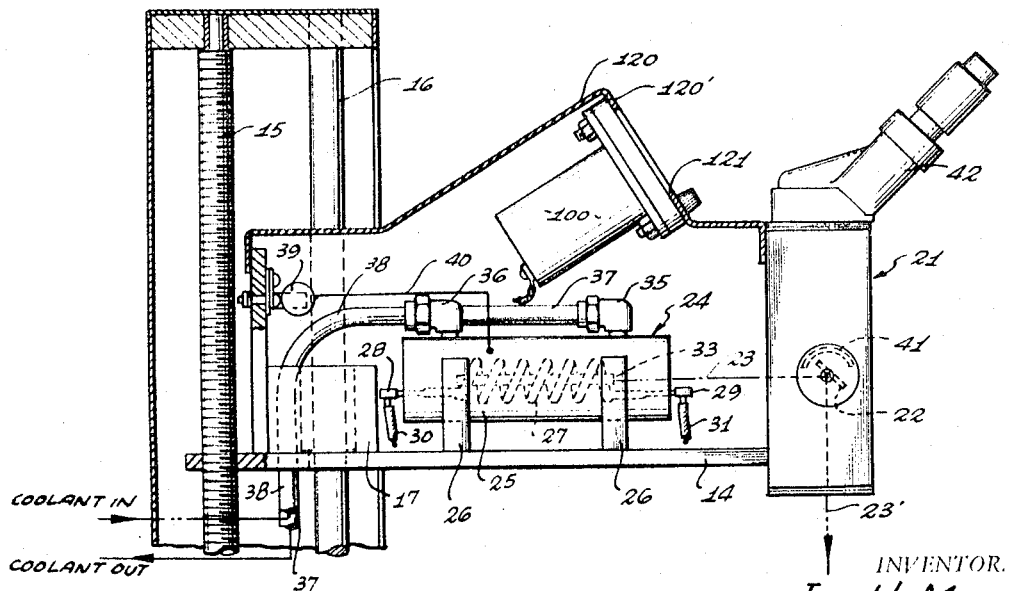
FIGURE 2 is a fragmentary, longitudinal sectional view of the tool of FIGURE 1, showing the floor of the laser housing supported for effecting vertical movement of the housing, and showing the laser structure supported in the housing for directing the laser beam to a beam splitter in the microscope attachment.

Referring to FIGURE 1, there is shown a base member 10 on the rear of which is mounted an elevator housing 11 having a front opening 12 into which one end of a laser support housing 13 extends. Referring to FIGURE 2 along with FIGURE 1, the laser support housing 13 is a hollow housing having a rigid floor member 14 which at its rear extends outwardly and rearwardly from the housing 13. Vertical rods 15, 16, preferably three in number, extend through rearwardly and outwardly extending portions of the floor 14.

It will be seen that rods 16 are located in the side portions of the elevator housing 11, and the rod 15 is located in the center of the elevator housing and behind the laser housing 13. The rods 16 have smooth surfaces, and extend through bearing boxes 17 mounted on the side extensions of the floor 14. The other rod 15 is threaded, and is journaled at its ends for rotation in the top of the housing 11 and the base member 10. The opening of the floor 14 through which the threaded rod 15 extends is internally threaded so that, upon rotation of the rod 15, the floor 14, and hence the housing 13, can be raised and lowered as desired. To this end, an external crank 18 mounted on the top of the base member 10 is adapted to rotate the rod 15 as desired, as through suitable linkage (not shown) located within the base member 10. One example of a linkage for this purpose is shown in my co-pending application, "System For Focusing Laser Energy," Ser. No. 505,807, filed concurrently herewith.

As shown in FIGURE 1, the front portion of the base member 10 is provided with a depression or well 20 to receive a work piece that is to be treated with a laser beam. The forward end of the laser housing 13 extends over the well 20, and carries a microscope attachment 21 through which to view a work piece placed in the well 20. While the microscope attachment 21 is shown as having binocular eye-pieces, it will be apparent that a single eye-piece may be employed.

Again referring to FIGURE 2, the microscope attachment 21 carries a beam splitting reflecting mirror 22 which is disposed in the path 23 of the beam that emerges horizontally from a laser device 24, and deflects the beam vertically downward, as indicated at 23', to impinge upon the work piece in the well 20.

The laser device 24 shown is the type described in my copending application, "Laser Device," Ser. No. 505,789, filed concurrently herewith. Such laser has a cylindrical metal housing 25 that is carried on insulating supports 26 mounted on the floor 14. Mounted within the housing 25 is a pumping light source in the form of a helical flashlamp 27, the terminals 28, 29 of which extend through the opposite ends of the housing 25, and are connected to external leads 30, 31. A laser rod 33, e.g., a ruby rod, extends through the center of the lamp 27, and is arranged so that the laser beam therefrom emerges through the end of the shield nearest the mirror 22.

The lamp 27 is surrounded by a reflector (not shown) for concentrating the high intensity illumination from the lamp in the rod 33. Additionally, the laser rod 33 is suitably supported at its ends so as to be fixed in position within the housing 25. Fittings 35, 36 are provided for circulating a coolant through the housing 25, through appropriate flexible conduits 37, 38.

Further details of the laser device 24 may be obtained with reference to my aforementioned copending application. However, it will be apparent that various laser structures may be employed in accordance with the teachings of my invention.

The laser device 24 is operable by applying a high voltage to the flashlamp 27, and then applying a higher trigger voltage to the housing 25, as from a photoflash triggering transformer 39 mounted inside the laser housing 13, and through a lead 40 connected between the transformer 39 and the housing 25. The high intensity beam is emitted upon application of the high trigger voltage to the housing 25.

When the laser beam is emitted along the paths 23, 23', the mirror 22 is shielded from the microscope eye pieces. As shown in FIGURE 2, an opaque arcuate shield 41 is positioned over the mirror 22 when the beam is created. In this position of the shield 41, a person looking through the eye pieces of the microscope attachment 21 cannot view the beam or its reflection and be injured thereby.

Referring to FIGURES 1-4, the binocular head 42 is attached to the top of the microscope attachment 21, which houses a rectangular frame 43. The top wall of the frame 43 has a central opening 44 through which to permit the passage of light upwardly and through the eye pieces, as through suitably positioned deflecting mirrors 45, 46 (see FIGURE 4).

Light for illuminating the work piece placed in the well 20 is provided by a pair of reflecting lamps 50, 51 held in the lower end of the frame 43, as by bayonet sockets 52, 53. The lamps 50, 51 are positioned on opposite sides of an objective lens holder 54, in the lower end of which a lens 55 is mounted. As shown in FIGURES 3 and 4, the lens holder 54 is fixed in position in the lower end of the frame 43 by a set screw 56.

To permit the workpiece to be viewed through the binocular head 42, the shield 41 is rotated to a position in which it extends across the axis of the laser rod 33. In this position of the shield, light passes upwardly through the mirror 22, thereby allowing the operator to perform the desired focusing operations. To this end, the operator rotates the crank 18 to vertically position the laser housing 13 so that the laser beam will strike the object at the desired location. Further in this connection, it may be desired that the object be struck by the focal point of the beam, or a portion of the beam above or below the focal point thereof, in which case the laser housing 13 is adjusted vertically for this purpose.

To provide a mirror for the desired purposes, the mirror 22 may be a typical dichroic mirror, which is coated on its lower surface with material which causes substantially all the laser light to be deflected downwardly, but which does not obstruct passage of light of other frequencies (which illuminates the work piece) upwardly to the binocular eye pieces.

The above-described movement of the shield 41 is effected by an external control knob 60 (see FIGURES 1 and 3) on one side of the microscope attachment 21. The knob 60 is fixed to the outer end of a short stub shaft 61 which (see FIGURE 3) is supported for rotational movement in a bearing 62 that is supported in the frame 43. The shaft 61 carries a shield 41 on the inner end thereof, and a group of three cams 63-65 is secured to the shaft 61 intermediate the shield 41 and the frame 43.

The mirror 22 is supported within the shield 41 by a holder assembly 68 which is fixed to the side of the frame 43 opposite the knob 60. As best seen in FIGURES 3 and 4, the mirror 22 is a rectangular element, and is located within a circular block 69 which is hollowed out to provide a straight-through vertical passage 70 and an opening 71 at right angles to the passage 70 and on the axis 23 of the laser beam. An opening 72 is provided in the back wall of the frame for permitting the beam to pass into the passage 71. Further, the block 69 is shaped interiorly to provide a pair of diametrically opposed ledges to which the ends of the mirror 22 are cemented. With this construction, a solid portion of the block 69 is in the path of the undeflected portion of the laser beam which passes through the mirror 22. Accordingly, if the front cover 73 is removed from the frame 43, and a person looks at the front end of the structure when a laser beam is established, the block 69 shields him from possible eye damage by the undeflected part of the beam.

The block 69 is spaced from the inner end of a cylindrical support member 75 (see FIGURE 3) which is secured at 76 in the frame 43. Dowel pins 77 carried by the support member 75 extend into the block 69. Also, a threaded screw member 79 is threaded into the block 69 through an opening 78 in the support member 75. Additionally, a tension spring 80 surrounds the screw member 79 between the block 69 and the support member 75.

In this arrangement, the plane of the deflecting surface of the mirror 22 is set at the desired angle by rotational or angular adjustment of the support member 75, and by appropriately tightening or loosening the screw member 79, as explained in my aforementioned application, "System For Focusing Laser Energy." Thus, the mirror is adjusted in assembly of the tool so that it is properly positioned for deflecting the beam through the center of the objective lens 55, and to assure that the path 23' along which the beam is deflected is coaxial and coincides with the vertical observation beam on the lower side of the mirror 22.

As previously mentioned, the shield 41, through operation of the control knob 60, is movable to an upper position in which the beam is permitted to strike the mirror 22 and be deflected downwardly, while masking the beam from the operator's view, and to a lower position in which it extends across the axis of the laser so as to permit the operator to view the work piece below the microscope attachment 21. In FIGURE 4, the shield 41 is shown in its lower or viewing position across the path 23 from the laser, and its upper position is shown in phantom. Rotation of the control knob 60, and hence the shield 41, may be limited by providing suitable stops 83, 84 secured, respectively, to the back wall of the frame 43 and the inner surface of the cover 73 of the microscope attachment. Thus, in the upper position of the shield 41, to which it is moved by counterclockwise rotation of the control knob 60 (as viewed in FIGURE 4), the leading edge of the shield engages the stop 84. In the position in which it covers the opening 71, the opposite edge of the shield 41 engages the stop 83.

Any suitable arrangement for limiting movement of the shield may be employed in place of the stops 83, 84 without departing from my invention. Such stops, for example, may be provided by spaced pins fixed in the outer wall of the housing near the control knob 60, and the knob may be provided with a pointer which engages the pins at the desired limits.

In accordance with the scheme of my invention, the laser is inoperable when the shield 41 is in the viewing position, i.e., the position in which the operator is permitted to view the work piece. Further, rotation of the control knob to move the shield to its upper position prepares the laser for operation, but such operation cannot take place until the shield reaches its upper position. The cams 63–65 are utilized to effect the desired sequence of operations. As shown in FIGURE 3, the cams 63–65 are adapted to actuate respective microswitches 86–88. The switches are adapted for sequential operation by the cams 63–65, and for this purpose, and as best seen in FIGURE 5 with reference to the switch 88, each switch is provided with a cam follower actuating member 90 that is adapted to ride on the peripheral surface of the associated cam. As shown in FIGURE 5, the switch 88 is carried on the inner end of a support block 91 which is bolted at 92 to the back wall of the frame 43.

Figure 6:
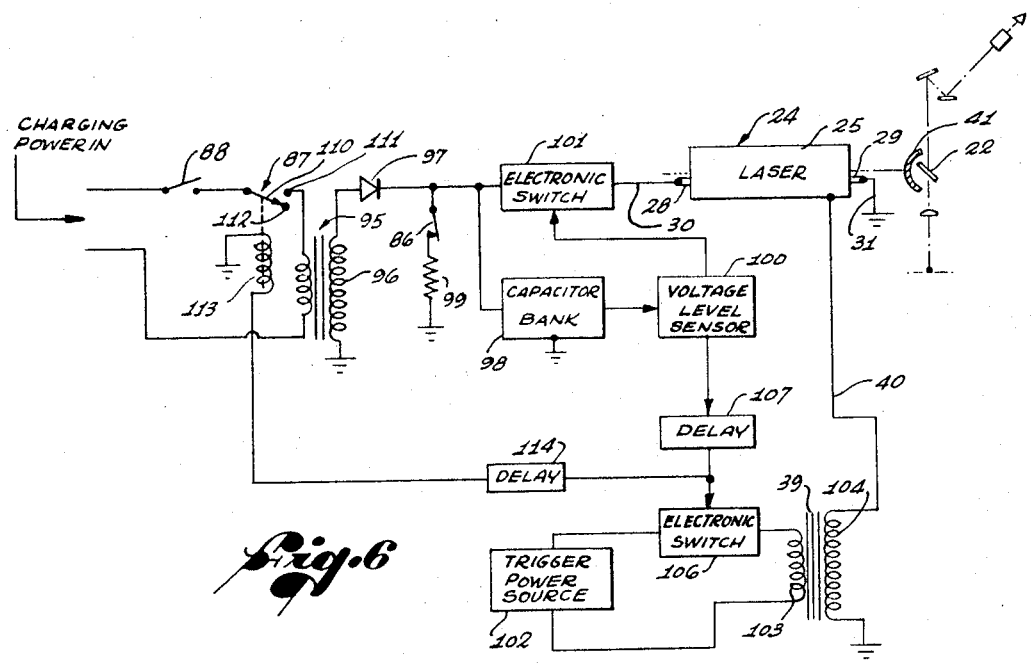
FIGURE 6 is a schematic diagram of a circuit of my invention for controlling the charging and triggering of the laser, and showing the positions of cam operated switches to prevent charging while the operator is using the microscope for focusing purposes.

Preparatory to explaining the operation of the cams 63–65, reference will be made to FIGURE 6, which illustrates a control circuit for the laser, and in which the switches 86–88 are incorporated. As shown in FIGURE 6 charging power for the laser 24 is applied to a transformer 95, and the switches 87, 88 are connected in series in the primary circuit of the transformer. The secondary winding 96 of the transformer 95 is connected to a rectifier 97 for applying a charging voltage to a capacitor bank 98. The switch 86 is adapted to connect the output of a rectifier 97 through a low impedance 99 to ground, for shorting and removing the charge on the capacitors of the capacitor bank 98.

Coupled to the capacitor bank 98 is a voltage level sensor 100, which, for example, may be a voltmeter, and which, upon the charge voltage in the capacitor bank 98 reaching a predetermined level, closes a normally open electronic switch 101 to connect the capacitor bank 98 to the pumping light source of the laser. As shown, the lead 30 to the terminal 28 of the flashlamp is connected to the electronic switch 101, and the lead 31 from the lamp terminal 29 is connected to ground.

It will be apparent that the above-described build-up of charging voltage, and the application of such voltage to the flashlamp, occurs with the switches 87, 88 closed, and the shorting switch 86 open. Immediately following application of the charging voltage to the flashlamp, a trigger voltage is applied to the housing 25 from the triggering transformer 39. In this connection, a trigger power source 102 is adapted to be coupled to the primary winding 103 of the transformer 39, the secondary winding 104 of which is connected through the lead 40 to the housing 25.

The trigger power source 102 is coupled to the transformer 39 through a normally open electronic switch 106 which, like the electronic switch 101, is operated from the voltage level sensor 100, to be closed upon the charge voltage of the capacitor bank 98 reaching the desired level. A delay network 107 is connected between the voltage level sensor 100 and the electronic switch 106 causing the switch 106 to close, and apply the triggering voltage to the housing 25, a predetermined interval after the switch 101 is operated. Immediately upon the switch 106 being closed, the trigger voltage is applied to the cylindrical housing 25 to cause flashlamp to be ionized and the laser beam to be established.

The charging voltage for the pump lamp may be of the order of 4,000 volts, and the triggering voltage may be of the order of 15,000 volts. The delay between the instants of application of the charging and trigger voltages is extremely short, being of the order of 1 millisecond or less. The trigger voltage is applied at the instant the full charging voltage is established across the lamp terminals 28, 29, thus making the gas in the lamp conductive and permitting the energy of the capacitor bank to discharge through the lamp. In this manner, there is generated the intense burst of light which is required to establish a laser beam of the desired intensity.

In FIGURE 6, the switches 86–88 are shown in the positions in which they are set when the shield 41 is in the viewing position, switch 86 being closed and the other switches 87 and 88 being open. Referring to FIGURES 3 and 5a, along with FIGURE 6, the cams 63–65 are provided with respective notches 63'–65' designed to facilitate sequential operation of the switches 86–88 so that, upon rotation of the control knob 60 to move the shield 41 toward its upper position, the cam follower of the normally closed shorting switch 86 moves into the notch 63' of the cam 63, to allow the switch 86 to open.

Upon continued rotation of the control knob, and a few degrees of movement thereof after opening of the switch 86, the cam follower of the switch 87 moves into the notch 64' of the cam 64 to cause the switch 87 to close. Next, when the shield 41 reaches its upper position, the cam follower of the switch 88 moves into the notch 65' of the cam 65, to cause the switch 88 to close. Thereupon, the automatic sequence of charging the capacitor bank 98, closing the electronic switch 101 to charge the flashlamp, and closing the electronic switch 106 to apply the trigger voltage to the housing 25, is effected to establish a laser beam.

The above-described sequence of switch operations is illustrated in FIGURES 7–9. In FIGURE 7, the shorting switch 86 is open, while the switches 87 and 88 remain open. As shown at the right hand end of the laser 24 in FIGURE 7, the shield 41 has been started toward its upper position.

In FIGURE 8, the shorting switch 86 remains open, the switch 87 is closed, and the switch 88 remains open. The shield 41 is shown further along in its travel toward its upper position, corresponding to that position in which the switch 87 is closed.

In FIGURE 9, the shorting switch 86 remains open, the switch 87 remains closed, and the switch 88 is closed. Such closure of the switch 88 occurs when the shield 41 reaches its upper position.

The switch 87 need not be employed if it is desired to permit repetitive operation of the laser. In this connection, it will be seen that the switch 87 may be eliminated, along with its associated cam, in which case the sequential opening of the shorting switch 86 and closing of the charging switch 88 will, following each triggering operation, and consequent discharge of the charging voltage through the laser, reduce the charging voltage below that required to effect closure of the electronic switches 101, 106, to allow the capacitor bank 98 to be charged again. When the capacitor bank 98 again reaches the desired charge level, the above-described sequence of operations of the switches 101, 106 occurs to apply the charging voltage to the pump lamp, and to apply the trigger voltage to the housing 25.

For such repetitive operation of the laser, it can only be stopped by rotating the control knob 60 to the viewing position of the shield 41, thereby to open the switch 88 and close the switch 86. My invention permits such operation in any event, so that when the shield 41 is in the viewing position, the switch 86 is closed to permit any residual charge on the capacitor bank 98 to be shorted to ground.

However, it may be desired to have only a single burst of a laser beam, and my invention embraces means for automatically opening the charging circuit following a single charging and triggering cycle. To this end, I select for the switch 87 a toggle-type switch mechanism in which the movable arm 110 has two stable positions, in which it engages respective fixed contacts 111, 112. As shown in FIGURES 6 et seq., the fixed contact 111 is connected to the primary of the transformer 95, and the contact 112 is a dead position contact.

The movable arm 110 of the switch 87 is normally, i.e., in the viewing position of the shield 41, in the open position in which it engages the dead contact 112, and is moved into engagement with the contact 111 by the action of its associated cam 64. However, the movable arm 110 is also incorporated in a relay, in which energization of the relay control coil 113 causes the arm 110 to be moved from engagement with the live contact 111 and into engagement with the dead contact 112.

The relay coil 113 is automatically energized to effect the desired opening of the switch 87 immediately upon triggering the laser in the manner previously described. To this end, and as shown in FIGURE 6, the relay coil 113 is connected through a delay network 114 and the delay network 107 to the voltage level sensor 100. The delay network 114 permits the application of the control voltage to the relay coil 113 immediately following closing of the electronic switch 196 to apply the trigger voltage to the housing 25. The relay coil 113 is energized before the capacitor bank 98 can recharge the level required for applying the charging and triggering voltages to the laser. Immediately upon the relay coil 113 being energized, the switch 87 is opened, thereby preventing further laser operation.

FIGURE 10 illustrates the positions of the switches 86–88 under such conditions. The shorting switch 86 remains open, and the switch 88 remains closed. However, the switch 87 has been opened, to place the movable arm 110 in engagement with the dead contact 112.

With the switches 86–88 set in the position shown in FIGURE 10, the operator must manipulate the control knob 60 in order to initiate another one-shot laser operation. To do this, he needs only to rotate the knob back sufficiently to permit the cam 64 to reset the movable arm 110 of the switch 87 and cause it to engage the fixed contact 111. However, immediately upon starting such backward travel, the cam 65 permits the switch 88 to open. Accordingly, upon moving the cams to the position in which the switch 87 is again closed, the operator must then return the control knob to the position in which the shield 41 is in its upper position, whereupon the switch 88 is again closed to initiate the charging and triggering cycles.

The operator may also return the control knob 60 to the position in which the shield 41 is in the viewing position, thereby resetting all the switches 86–88 to the positions shown in FIGURE 6. When this occurs, the shorting switch 86 causes the capacitor bank to be completely discharged. Thereafter, rotation of the control knob in the opposite direction, until the shield 41 is in its upper position, effects the same sequence of switch operations as previously described and as shown in FIGURES 6–9.

Referring again to FIGURES 1 and 2, the voltage level sensor 100 is shown as a voltmeter which is secured to the top panel 120 of the laser housing 13. As shown, this panel is provided with an upwardly sloping face 120' which is provided with a window 121 through which the operator can view the dial 122 and pointer 123 the voltmeter 100. The voltmeter is also provided with a set point selector needle 124 and a selector knob 125 with which to set the needle 124 at the desired position. When the pointer 123 reaches the same dial position as the needle, the electronic switches 101, 106 (FIGURE 6) are operated to effect the laser charging and triggering cycle.

Thus, the operator is able to observe the position of the pointer 123 as it moves up the scale and select the point at which the laser fires. Additionally, the operator can tell, from the position of the pointer 123, the magnitude of any residual charge on the capacitor bank after firing. Any such residual charge should be removed upon turning the control knob 60 back to the starting position in which the shorting switch 86 is closed. But if any charge is still indicated on the voltmeter after thus operating the control knob, the operator is alerted to a malfunction that exists and is to be corrected before again operating the equipment.

From the foregoing, it will be apparent that various modifications can be made in the laser tool construction illustrated without departing from the spirit and scope of my invention. Accordingly, I do not intend that my invention be limited, except as by the appended claims.

I claim:

1. A laser tool comprising:
    a housing;
    a laser device supported in said housing, said laser device being adapted to generate and direct a laser beam in a predetermined direction upon application thereto of a charging voltage and a triggering voltage;
    a beam deflector carried by the housing and located in the path of the beam to deflect the beam along a predetermined path to the exterior of said housing;
    means to permit an object exteriorly of said housing and along said predetermined path to be viewed through said deflector, said means including a lens structure having a viewing axis aligned with said predetermined path;
    circuit means for applying power to said laser device to create a laser beam, including switch means to be operated to permit charging and triggering voltages to be applied to the laser device; and
    an external manual control member mounted in said housing and coupled to said switch means and including a movable shield element disposed adjacent said deflector, said member being operable in one position thereof to position said shield element between said deflector and said laser device and to prevent operation of said switch means while permitting viewing of an object through said deflector, and in another position thereof to position said shield element on said viewing axis between said deflector and said lens structure to thereby prevent any light energy from propagating along said viewing axis toward said lens structure and to operate said switch means to cause the charging and triggering voltages to be applied to said laser device.

2. A laser tool as defined in claim 1, including a pair of switches in said circuit means to be selectively operated before applying a charging voltage to said laser device;
    means operable by said manual control member during its movement from said one position to said other position thereof to operate one of said switches, and operable upon said manual control member reaching said other position thereof to operate the other of said switches; and
    means responsive to operation of said other switch to sequentially apply charging and triggering voltages to said laser device.

3. A laser device as defined in claim 2, further including a third switch, said switch operating means being operable during the period between operating the switches of said pair to operate said third switch, said third switch permitting the charging voltage to be applied to said laser device when said other switch is operated; and means operable upon application of the triggering voltage to said laser device to actuate said third switch and prevent further application of charging and triggering voltages to said laser device.

4. A laser tool as defined in claim 1, wherein said manual control member is a knob; a shaft extending at one end through said housing and toward said deflector, said knob being secured to said one end of said shaft, and wherein said shield element is a plate secured to the inner end of said shaft.

5. A laser tool as defined in claim 4, including a pair of spaced limit stops secured to said housing; and means carried by said shaft to engage the respective stops and thereby limit rotation of said knob, said last-named means engaging one stop in said one position of said knob and engaging the other stop in said other position of said knob.

6. A laser tool as defined in claim 5, wherein said laser device is one having a laser rod surrounded by a pump light to which charging voltage is to be applied, and which includes means adjacent the pump light to receive the triggering voltage when charging voltage is applied to the pump light;
a capacitor bank;
a shorting switch connected across said capacitor bank;
a source of charging voltage;
means for coupling said source to said capacitor bank;
a second switch connected between said coupling means and said source;
a cam on said shaft for operating said shorting switch, said shorting switch being closed in said one position of said knob, said cam opening said switch during movement of said knob to the other position thereof;
a second cam on said shaft for operating said second switch, said switch being open in said one position of said knob and throughout movement of said knob to said other position thereof, said second cam closing said second switch at said other position of said knob, whereby said source is connected to said capacitor bank;
a source of triggering voltage; and
means operable upon the charge voltage across said capacitor bank reaching a predetermined level to couple said capacitor bank to said pump light and to couple said source of triggering voltage to said means for receiving triggering voltage.

7. A laser tool as defined in claim 6, including:
a third switch connected in series with said second switch, said third switch having a movable contact connected to said source of charging voltage, said third switch having a pair of fixed contacts, one being a dead contact and the other being connected to said coupling means, said movable contact engaging said dead contact in said one position of said knob;
a third cam on said shaft operable to move said movable contact into engagement with said other contact during movement of said knob toward said other position thereof after said shorting switch is opened; and
relay means operable after the knob reaches said other position thereof, so as to effect charging and triggering of said laser device, to move said movable contact to said dead contact, thereby preventing further application of charging voltage to said capacitor bank.

8. A laser tool as defined in claim 7, wherein said means for coupling said capacitor bank and source of triggering voltage to the laser device includes means for measuring the charge voltage across said capacitor bank; a first normally open electronic switch connected between said capacitor bank and said pump light; a second normally open electronic switch connected between said source of triggering voltage and the means for receiving the triggering voltage; said measuring means being operable to close both electronic switches only when the charge voltage across said capacitor bank reaches a predetermined level.

9. A laser tool as defined in claim 8, wherein said housing has a window in one portion thereof, and said measuring means including a voltmeter having a dial, a pointer, and an adjustable set point needle, said voltmeter being mounted in said housing with said dial, pointer and needle exposed to view in said window; and means for setting said needle at a position on the dial corresponding to the voltage at which the laser device is to be fired, said measuring means being operative to close said first and second electronic switches when said pointer reaches the dial position of said needle.

10. A laser tool as defined in claim 9, including a base member having a portion for supporting an object in the predetermined path of the laser beam; and elevator means on said base member for supporting said housing and including means for moving said housing toward and away from said base member.

References Cited

UNITED STATES PATENTS 1,932,337  10/1933  Dowling.
3,369,101  2/1968  Di Curcio _____ 331—94.5

OTHER REFERENCES

Microwelding, Maguire, T., Electronics, July 5, 1963.

RONALD L. WIBERT, Primary Examiner
V. P. McGRAW, Assistant Examiner

U.S. Cl. X.R.
219—121